(12) United States Patent
Adachi

(10) Patent No.: US 9,967,344 B2
(45) Date of Patent: May 8, 2018

(54) IMAGE PROCESSING APPARATUS, COMMUNICATION SYSTEM, AND RELAY DEVICE

(71) Applicant: BROTHER KOGYO KABUSHIKI KAISHA, Nagoya-shi, Aichi-ken (JP)

(72) Inventor: Toyoshi Adachi, Kakamigahara (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days. days.

(21) Appl. No.: 14/670,790

(22) Filed: Mar. 27, 2015

(65) Prior Publication Data
US 2015/0277816 A1 Oct. 1, 2015

(30) Foreign Application Priority Data

Mar. 28, 2014 (JP) .................................. 2014-069015

(51) Int. Cl.
*G06F 15/00* (2006.01)
*H04L 29/08* (2006.01)
*H04L 29/06* (2006.01)

(52) U.S. Cl.
CPC .......... *H04L 67/125* (2013.01); *H04L 63/083* (2013.01); *H04L 67/34* (2013.01)

(58) Field of Classification Search
CPC ..... G06F 3/1231; G06F 3/1285; H04L 67/34; H04L 67/125
USPC ....................................................... 358/1.15
See application file for complete search history.

(56) References Cited

U.S. PATENT DOCUMENTS

| 2008/0068647 | A1 | 3/2008 | Isobe et al. | |
| 2008/0282333 | A1* | 11/2008 | Teramoto | G06F 21/608 726/8 |
| 2012/0307302 | A1* | 12/2012 | Furukawa | H04N 1/00222 358/1.15 |
| 2013/0083343 | A1* | 4/2013 | Ohara | G06F 3/1219 358/1.13 |
| 2015/0235149 | A1* | 8/2015 | Rai | G06Q 10/067 705/28 |

FOREIGN PATENT DOCUMENTS

JP 2008-104143 A 5/2008

* cited by examiner

*Primary Examiner* — Mark R Milia
(74) *Attorney, Agent, or Firm* — Scully, Scott, Murphy & Presser, PC

(57) ABSTRACT

An image processing apparatus includes: a communication interface configured to communicate with at least one server and a relay device; a processor configured to execute functions; and a controller. The controller causes the image processing apparatus to: send the relay device identification information identifying the image processing apparatus; receive, from the relay device, setting information indicating which service is usable by the image processing apparatus identified by the transmitted identification information, among services provided by the at least one server; display at least one service image respectively identifying at least one usable service of the services based on the setting information; and limit selection of at least one of the functions, based on the setting information.

17 Claims, 13 Drawing Sheets

FIG.13
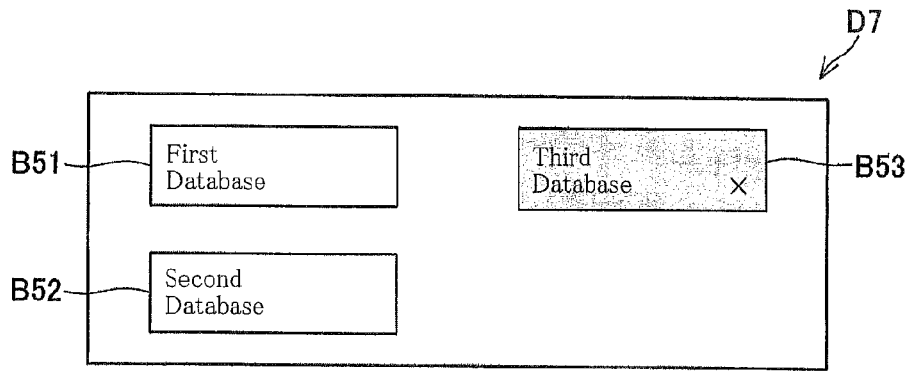
FIG.14
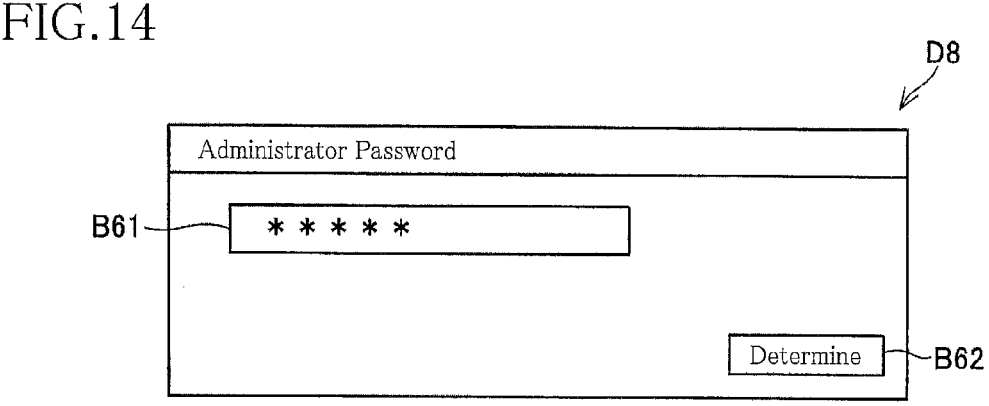
FIG.15
| MFP ID | FIRST SERVICE | SECOND SERVICE | THIRD SERVICE | |
|---|---|---|---|---|
| MFP-10 | AVAILABLE | NOT AVAILABLE | AVAILABLE | ---R22 |
| MFP-10a | NOT AVAILABLE | NOT AVAILABLE | AVAILABLE | ---R21 |
| MFP-10b | AVAILABLE | AVAILABLE | NOT AVAILABLE | |
| ... | ... | ... | ... | |

FIG.16

| USER ID 331 | PASSWORD 332 | PRINT-FUNCTION-USE SETTING INFO 333 | COPY-FUNCTION-USE SETTING INFO 334 | FAX-FUNCTION-USE SETTING INFO 335 | SCAN-TO-FTP-USE SETTING INFO 336 | SCAN-TO-EMAIL-USE SETTING INFO 337 |
|---|---|---|---|---|---|---|
| user-A | **** | NOT AVAILABLE | NOT AVAILABLE | AVAILABLE | AVAILABLE | AVAILABLE |
| user-B | **** | NOT AVAILABLE | AVAILABLE | NOT AVAILABLE | AVAILABLE | NOT AVAILABLE |
| user-C | **** | AVAILABLE | AVAILABLE | AVAILABLE | AVAILABLE | AVAILABLE |

| USER ID | PASSWORD | FIRST DATABASE | SECOND DATABASE | THIRD DATABASE |
|---|---|---|---|---|
| user-A | **** | AVAILABLE | AVAILABLE | NOT AVAILABLE |
| user-B | **** | NOT AVAILABLE | NOT AVAILABLE | AVAILABLE |
| user-C | **** | AVAILABLE | AVAILABLE | AVAILABLE |
| ... | ... | ... | ... | ... |

FIG.19

| SERVICE ID 310 | PRINT-FUNCTION-USE SETTING INFO 313 | COPY-FUNCTION-USE SETTING INFO 314 | FAX-FUNCTION-USE SETTING INFO 315 | SCAN-TO-FTP-FUNCTION-USE SETTING INFO 316 | SCAN-TO-EMAIL-FUNCTION-USE SETTING INFO 317 |
|---|---|---|---|---|---|
| FIRST SERVICE | NOT AVAILABLE | NOT AVAILABLE | NOT AVAILABLE | NOT AVAILABLE | NOT AVAILABLE |
| SECOND SERVICE | NOT AVAILABLE | NOT AVAILABLE | NOT AVAILABLE | AVAILABLE | AVAILABLE |
| THIRD SERVICE | AVAILABLE | AVAILABLE | AVAILABLE | AVAILABLE | AVAILABLE |

IMAGE PROCESSING APPARATUS, COMMUNICATION SYSTEM, AND RELAY DEVICE

CROSS REFERENCE TO RELATED APPLICATION

The present application claims priority from Japanese Patent Application No. 2014-069015, which was filed on Mar. 28, 2014, the disclosure of which is herein incorporated by reference in its entirety.

BACKGROUND

Technical Field

The present invention relates to: an image processing apparatus connected to a communication system and a relay device over a network; the communication system; and the relay device.

Description of the Related Art

There is conventionally known a communication system including a printer, an authentication server, and a plurality of services. In such a communication system, the authentication server accepts registration of user information. In the registration of the user information, the user information for identifying a single user and one or more pieces of service information are stored into a storage in association with each other. The stored one or more pieces of service information are available by the registered user among a plurality of pieces of service information respectively identifying a plurality of services including various functions such as copying, scanning, and facsimile functions. When having received the user information from a printer, the authentication server reads one or more pieces of service information or services available by a user identified by the received user information. The authentication server causes a display of the printer to display one or more images respectively indicated by the read one or more pieces of service information. The printer accepts user's selection of the service information. Also, a related technique is known.

SUMMARY

A large number of new kinds of services are recently proposed in the field of services using a network. Accordingly, an aspect of the disclosure relates to a new configuration in which a processing for selection of a new kind of service is executed by a printer.

In one aspect of the disclosure, an image processing apparatus includes: a communication interface configured to communicate with at least one server and a relay device; a display; a processor configured to execute a plurality of functions; and a controller configured to cause the image processing apparatus to execute: an identification-information transmitting process in which the image processing apparatus transmits identification information to the relay device via the communication interface, the identification information identifying the image processing apparatus; a first receiving process in which the image processing apparatus receives setting information from the relay device via the communication interface, the setting information indicating which service is usable, based on limitation of a function for the service, by the image processing apparatus identified by the identification information transmitted in the identification-information transmitting process, among a plurality of services provided by the at least one server; a first process in which the image processing apparatus controls the display to display at least one service image respectively identifying at least one usable service of the plurality of services based on the setting information; and a second process in which the image processing apparatus limits selection of at least one of the plurality of functions, based on the setting information.

In another aspect of the disclosure, a communication system includes at least one server; a relay device; and an image processing apparatus. The image processing apparatus includes: a communication interface configured to communicate with at least one server and a relay device; a display; and a processor configured to execute a plurality of functions. The image processing apparatus is configured to execute an identification-information transmitting process in which the image processing apparatus transmits identification information to the relay device via the communication interface. The identification information identifies the image processing apparatus. The relay device is configured to execute a setting-information transmitting process in which the relay device transmits setting information to the image processing apparatus via the communication interface. The setting information indicates which service is usable, based on limitation of a function for the service, by the image processing apparatus identified by the identification information transmitted in the identification-information transmitting process, among a plurality of services provided by the at least one server. The image processing apparatus is configured to execute: a first process in which the image processing apparatus controls the display to display at least one service image respectively identifying at least one usable service of the plurality of services based on the setting information; and a second process in which the image processing apparatus limits selection of at least one of the plurality of functions, based on the setting information.

In another aspect of the disclosure, a relay device includes a communication interface configured to communicate with (i) at least one server and (ii) a plurality of image processing apparatuses. Each of the plurality of image processing apparatuses includes a display and a processor configured to execute a plurality of functions. The relay device is configured to execute: an identification-information receiving process in which the relay device receives identification information via the communication interface from one image processing apparatus of the plurality of image processing apparatuses, the identification information identifying the one image processing apparatus; and a setting-information transmitting process in which the relay device transmits setting information to the one image processing apparatus via the communication interface, the setting information indicating which service is usable, based on limitation of a function for the service, by the one image processing apparatus identified by the identification information received in the identification-information receiving process, among a plurality of services provided by the at least one server. The setting information is used for the one image processing apparatus to: display at least one service image respectively identifying at least one usable service of the plurality of services; and limit selection of at least one of the plurality of functions, based on the setting information.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which:

FIG. 13 is a view illustrating one example of a database selection screen D7;

FIG. 14 is a view illustrating one example of an administrator screen D8;

FIG. 15 is a view illustrating one example of an administration table;

FIG. 16 is a view illustrating one example of a function limiting table;

FIG. 19 is a view illustrating an administration table TB2 as a modification of the administration table;

DETAILED DESCRIPTION OF THE EMBODIMENT

Configuration of System

Figure 1:
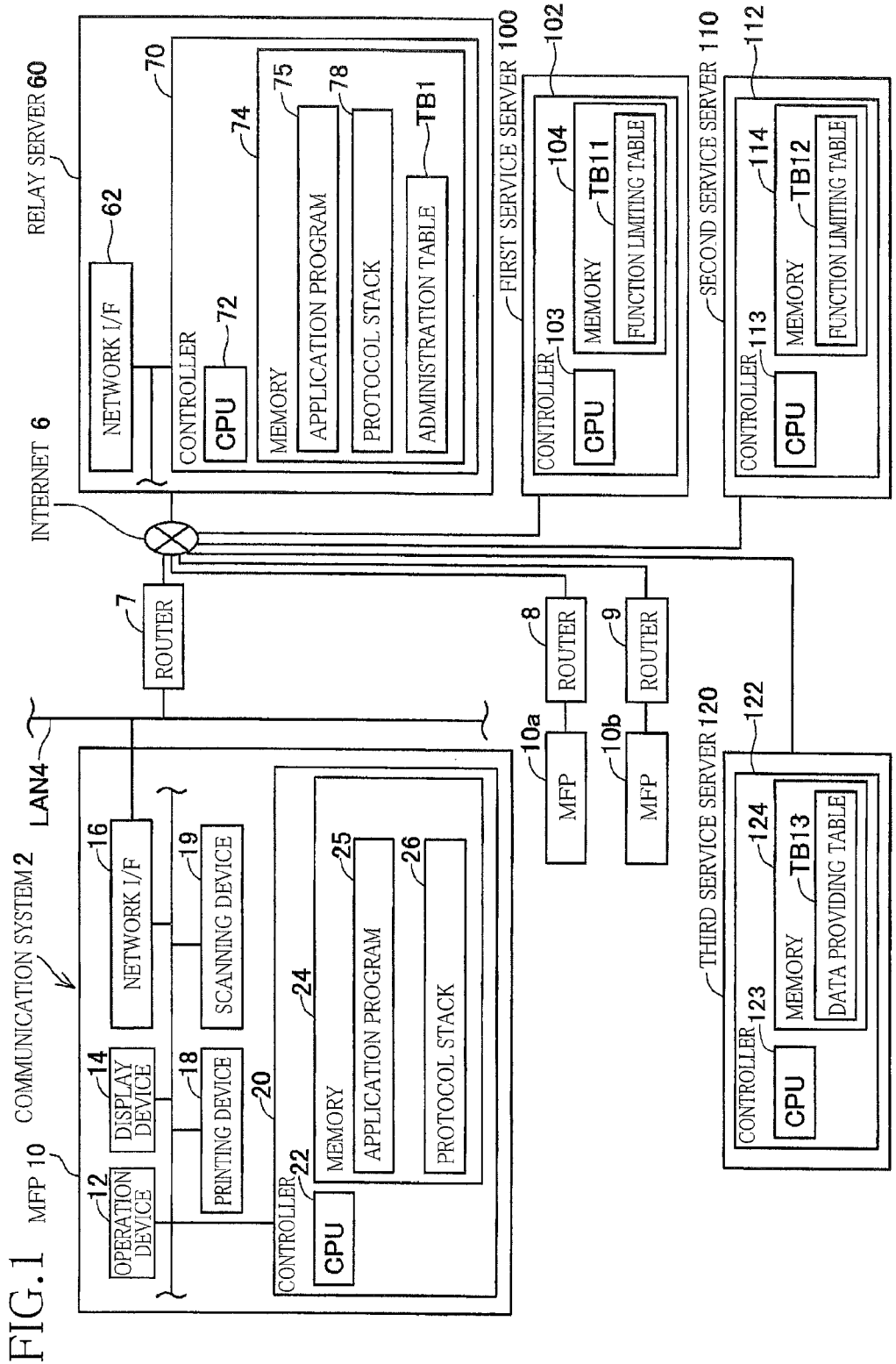
FIG. 1 is a view illustrating a configuration of a communication system.

As illustrated in FIG. 1, a communication system 2 includes routers 7-9, MFPs (Multi-function Peripherals) 10-10b, a relay server 60, and first-third service servers 100-120. The MFPs 10-10b are connected to the Internet 6 via the respective routers 7-9. The relay server 60 and the first-third service servers 100-120 are also connected to the Internet 6.

Configuration of MFP 10

The MFP 10 can execute various functions such as a printing function, a facsimile function, a scanning function, and a copying function. The MFP 10 includes an operation device 12, a display device 14, a network interface 16, a printing device 18, a scanning device 19, and a controller 20. The operation device 12 includes a plurality of keys. A user can operate the operation device 12 to input various instructions to the MFP 10. The display device 14 is a display for displaying various kinds of information. The network interface 16 is connected to the router 7 via the LAN 4. The network interface 16 can communicate with the first-third service servers 100-120. The printing device 18 includes an ink-jet or laser printing mechanism, for example. The scanning device 19 includes a scanning mechanism such as a CCD or a CIS. The controller 20 includes a CPU 22 and a memory 24. The memory 24 stores an application program 25 and a protocol stack 26. The memory 24 is one example of a non-transitory storage medium readable by a computer. The memory 24 stores a lock flag, service change information, and other similar information. The lock flag and the service change information will be explained later in detail.

According to the application program 25 stored in the memory 24, the CPU 22 executes processings for using various kinds of services (which will be described below) provided by the first-third service servers 100-120. According to the protocol stack 26 stored in the memory 24, the CPU 22 executes a protocol processing for protocols such as HTTP (Hyper Text Transfer Protocol) and XMPP over BOSH (eXtensible Messaging and Presence Protocol over Bidirectional-streams Over Synchronous HTTP). In the protocol processing, the CPU 22 establishes a session according to XMPP over BOSH (which will be described below) and connection according to HTTP. It is noted that the session according to XMPP over BOSH may be hereinafter referred to as "XMPP session". XMPP over BOSH is one example of a session establishment protocol.

In the present specification, wordings "the CPU 22 of the MFP 10 transmits or receives various kinds of information" include techniques "the CPU 22 of the MFP 10 outputs or acquires various kinds of information via the network interface 16. This applies to a CPU 72 and a network interface 62 of the relay server 60.

Configuration of Relay Server 60

The relay server 60 is provided independently of the first-third service servers 100-120. The relay server 60 is an intermediary for relaying accesses between the first-third service servers 100-120 and the MFPs 10-10b. The relay server 60 is provided by a vendor of the MFPs 10-10b. The relay server 60 includes the network interface 62 and a controller 70.

The controller 70 includes the CPU 72 and a memory 74. The memory 74 stores an application program 75, a protocol stack 78, and administration tables TB1, TB2. The memory 74 is another example of the non-transitory storage medium readable by the computer. The CPU 72 executes various kinds of processings (which will be described below) according to the application program 75. Processings executed by the CPU 72 according to the protocol stack 78 are similar to those executed by the MFP 10 according to the protocol stack 26.

The administration table TB1 stores information about which service can be used by each of the MFPs 10, 10a, 10b among first-third services. FIG. 15 illustrates one example of the administration table TB1. Each of MFPIDs 300 is information for identifying a corresponding one of the MFPs 10, 10a, 10b and may be a manufacturer's serial number of the MFP, for example. Each of first service-use setting information 301, second service-use setting information 302, and third service-use setting information 303 indicates whether the MFP identified by the MFPID 300 is set at a state in which the MFP can use a corresponding one of the first-third services. The information stored in the administration table TB1 may be registered in advance by an owner of each of the MFPs 10, 10a, 10b.

The administration table TB2 stores information about which function is set in a usable state among the various kinds of functions for each of the first-third services in a period before user login (i.e., a period before user authentication at S571). FIG. 19 illustrates one example of the administration table TB2. Each of service IDs 310 is information for identifying a corresponding one of the first-third services and may be a URL, for example. Each of sets of information 313-317 is the same as a corresponding one of sets of information 333-337 (see FIG. 16) which will be described below, and an explanation of which is dispensed with. The information stored in the administration table TB2 may be registered in advance by a provider of the first-third services.

Configuration of First Service Server 100

The first service server 100 provides the first service. The first service is a function limiting service. The function limiting service limits execution of at least some of the plurality of functions of the MFP (such as the printing function, the facsimile function, and the scanning function). The function limiting service may be in one of various forms. For example, the function limiting service may be in a first form in which the function limiting service limits permission of use of one or ones of the plurality of functions of the MFP, for each of a plurality of users. In the first form, when a user has logged into the function limiting service (S571), types of usable functions are limited for the user having logged in (S575). Also, for example, the function limiting service may be in a second form in which the function limiting service limits permission of use of one or ones of the plurality of functions of the MFP, for each of a plurality of function limiting services. In the second form, when services usable by the MFP are determined (S520), the types of usable functions are limited according to the usable services. The first form will be explained in the present embodiment, and the second embodiment will be explained later in a second modification.

The first service server 100 includes a controller 102. The controller 102 includes a CPU 103 and a memory 104. The memory 104 stores a function limiting table TB11. The function limiting table TB11 stores information about which functions are permitted for their respective uses among the plurality of functions of the MFP for each of the users. FIG. 16 illustrates one example of the function limiting table TB11. Each of user IDs 331 is information for identifying a corresponding one of the users A-C and may be a user name, for example. Each of passwords 332 is information for login authentication in the first service and may be a character string which is set by a corresponding one of the users A-C in advance, for example. Printing-function-use setting information 333 indicates whether or not the printing function of the MFP has been set to a state in which the function can be used by the user. Copying-function-use setting information 334 indicates whether or not a function for scanning and printing a document has been set to a state in which the function can be used by the user. Facsimile-function-use setting information 335 indicates whether or not a function for transmitting and receiving facsimiles has been set to a state in which the function can be used by the user. Scan_to_FTP (File Transfer Protocol)-function use setting information 336 indicates whether or not a function for uploading scanned data to a designated FTP server has been set to a state in which the function can be used by the user. Scan_to_Email-function-use setting information 337 indicates whether or not a function for transmitting Email attached with scanned data has been set to a state in which the function can be used by the user. Information stored in the function limiting table TB11 may be registered in advance by each of the users A-C.

Configuration of Second Service Server 110

The second service server 110 provides the second service. The second service is the function limiting service. The second service server 110 includes a controller 112, a CPU 113, and a memory 114. The memory 114 stores a function limiting table TB12. It is noted that the second service server 110 and the function limiting table TB12 are respectively the same as the first service server 100 and the function limiting table TB11, and an explanation of which is dispensed with.

Configuration of Third Service Server 120

The third service server 120 provides the third service. The third service is a data providing service for providing various kinds of databases. The third service server 120 includes a controller 122, a CPU 123, and a memory 124. The memory 124 stores a data providing table TB13. The function limiting table TB11 stores information about which databases are permitted for their respective uses among the various kinds of databases provided by the third service server 120, for each of the users.

Figures 17, 18:
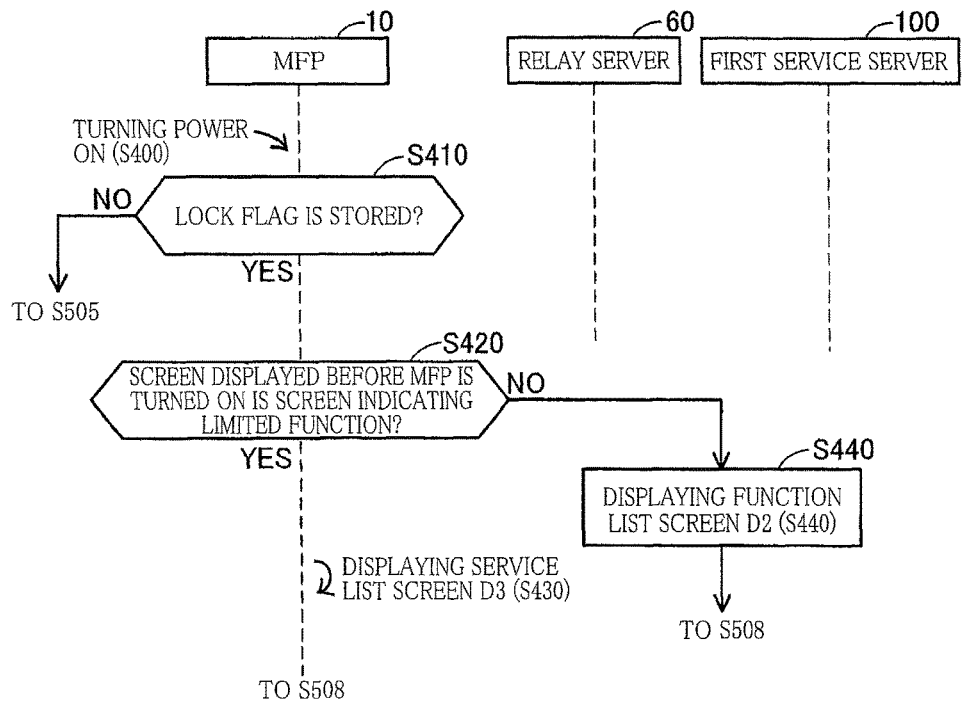
FIG. 17 is a view illustrating one example of a data providing table.
FIG. 18 is a view illustrating a first modification.

FIG. 17 illustrates one example of the data providing table TB13. Each of user IDs 431 is information for identifying a corresponding one of the users A-C and may be a user name, for example. Each of passwords 432 is information for login authentication in the third service. Each sets of database-use setting information 433-435 indicates whether or not a corresponding one of the first-third databases has been set to a state in which the database can be used by the user. Information stored in the data providing table TB13 may be registered in advance by each of the users A-C.

Operations of Communication System 2 (with User Operations)

There will be next explained, with reference to FIGS. 2-5, a flow of operations and processings in the communication system 2 in the case where the user operates the MFP.

Figure 7:
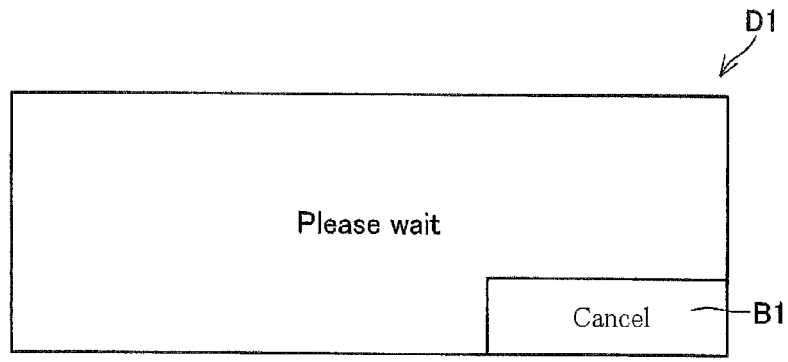
FIG. 7 is a view illustrating one example of a wait screen D1.

When the MFP 10 is turned on at S400, this flow goes to S505 at which the CPU 22 of the MFP 10 displays a wait screen D1 on the display device 14. The wait screen D1 is a screen for indicating that the MFP 10 is waiting for completion of acquisition of service setting information from the relay server 60. FIG. 7 illustrates one example of the wait screen D1. The wait screen D1 contains a button image B1. The button image B1 is an image for receiving input of a canceling instruction which is provided for canceling the processing for receiving the service setting information from the relay server 60.

The CPU 22 at S508 transmits an XMPP-session-establishment request information to the relay server 60. The XMPP-session-establishment request information is information for requesting establishment of the XMPP session according to XMPP over BOSH with the relay server 60. The XMPP session is a session for allowing push transmission in which HTTP request information is transmitted from the relay server 60 to the MFP 10 over a firewall on the router 7. The XMPP-session-establishment request information contains an MFPID for identifying the MFP 10. One example of the MFPID is a manufacturer's serial number of the MFP 10.

The CPU 22 at S510 uses the established XMPP session to control the protocol stack 26 to execute a protocol processing in which XMPP connection which is connection according to XMPP over BOSH is established between the MFP 10 and the relay server 60. As a result, the XMPP connection is established. Since a technique for establishing the XMPP connection is well known, and an explanation of which is dispensed with.

The CPU 72 of the relay server 60 at S518 reads the administration table TB1. As a result, the CPU 72 can recognize which service or services the MFP 10 identified by the MFPID received S508 is set to be permitted to use among the first-third services.

The CPU 22 at S520 transmits the service setting information to the MFP 10. The service setting information contains various kinds of information including: information of which service or services the MFP 10 is set to be permitted to use among the first-third services; information which service or services are the function limiting service among the first-third services; display names of the respective first-third services; and URLs of the respective first-third services.

In the MFP 10, the CPU 22 at S517 determines whether or not the CPU 22 has received the input of the canceling instruction for canceling a processing in which the CPU 22 waits for the reception of the service setting information. This determination may be executed based on whether the button image B1 has been tapped or not. When a negative decision is made (S517: NO), the CPU 22 waits for the reception of the service setting information and at S520 receives the service setting information from the relay server 60, and this flow goes to S530.

The CPU 22 at S530 determines whether at least one of the first-third services is set to be available to the MFP 10 or not. This determination is executed based on the service setting information received at S520. When a negative decision is made (S530: NO), this flow goes to S531. The CPU 22 at S531 displays a function list screen D2 on the display device 14. The function list screen D2 is a screen on which the various kinds of functions of the MFP 10 are displayed in a state in which selection of each function can be received.

Figure 8:
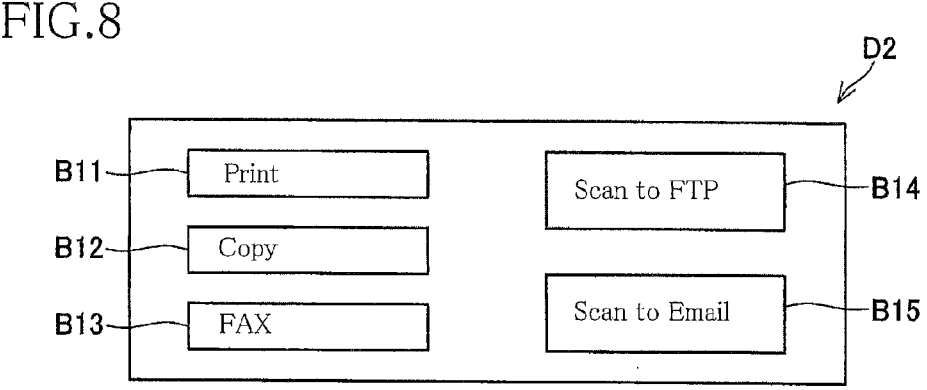
FIG. 8 is a view illustrating one example of a function list screen D2.

FIG. 8 illustrates one example of the function list screen D2. Each of button images B11-B15 is an image for receiving input of instruction for execution of a corresponding one of the printing function, the copying function, the facsimile function, the scan_to_FTP function, and the scan_to_Email function.

The CPU 22 at S532 stores a lock flag indicating "Not Limited" into a non-transitory storage area of the memory 24. The lock flag indicating "Not Limited" is information indicating that uses of the various kinds of functions of the MFP 10 are not limited. The CPU 22 at S533 executes various kinds of processings using a selected one of the plurality of functions displayed on the function list screen D2 (see FIG. 8). It is noted that the selected function is a function for which an instruction of execution has been received. The CPU 22 at S534 determines whether a setting has been changed or not on one of the relay server 60 and the first-third service servers 100-120 during the execution of the processing at S533. The processing at S534 will be described later at S610. When a negative decision is made (S534: NO), this flow returns to S531. When a positive decision is made (S534: YES), this flow returns to S530.

When a positive decision is made at S530 (S530: YES), this flow goes to S535. The CPU 22 at S535 determines whether the services available to the MFP 10 contain the function limiting service or not. This determination may be executed based on the service setting information received at S520. When a positive decision is made (S535: YES), this flow goes to S538.

The CPU 22 at S538 stores a lock flag indicating "Limited" into the non-transitory storage area of the memory 24. The lock flag indicating "Limited" is information indicating that uses of the various kinds of functions of the MFP 10 are limited.

The CPU 22 at S540 displays a service list screen D3 on the display device 14. The service list screen D3 is a screen which contains images respectively representative of usable services and which receives selection of a use target service that is a service to be used. Also, the service list screen D3 does not contain a function-selection button image B42 (see FIG. 12) which will be described below. That is, the service list screen D3 is in a locked state so as to disallow use of the various kinds of functions of the MFP 10. This locked state can be canceled when user authentication has succeeded at S571 which will be described below.

Figure 9:
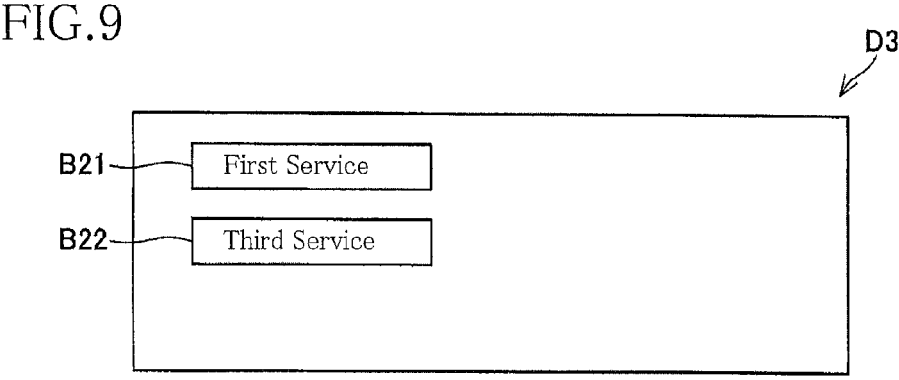
FIG. 9 is a view illustrating one example of a service list screen D3.

FIG. 9 illustrates one example of the service list screen D3. Each of button images B21, B22 is for receiving input of an instruction for selecting a corresponding one of the first service and the third service as the use target service. A character string displayed for each of the button images B21, B22 may be displayed according to a display name of a corresponding one of the first and third services, which display name is contained in the service setting information received at S520.

The CPU 22 at S545 receives input of user's selection of the use target service. For example, the input of selection of the use target service may be received in response to tapping on one of the button images displayed on the service list screen D3. When the button image B21 representative of the first service is selected on the service list screen D3, for example, this flow goes to S550, and when the button image B22 representative of the third service is selected, this flow goes to S750.

The CPU 22 at S550 sends the first service server 100 information for requesting user-authentication screen information. A destination of transmission of the information for requesting the user-authentication screen information may be determined based on a URL of the first service which is contained in the service setting information received at S520. The CPU 22 at S555 receives the user-authentication screen information from the first service server 100.

Figure 10:
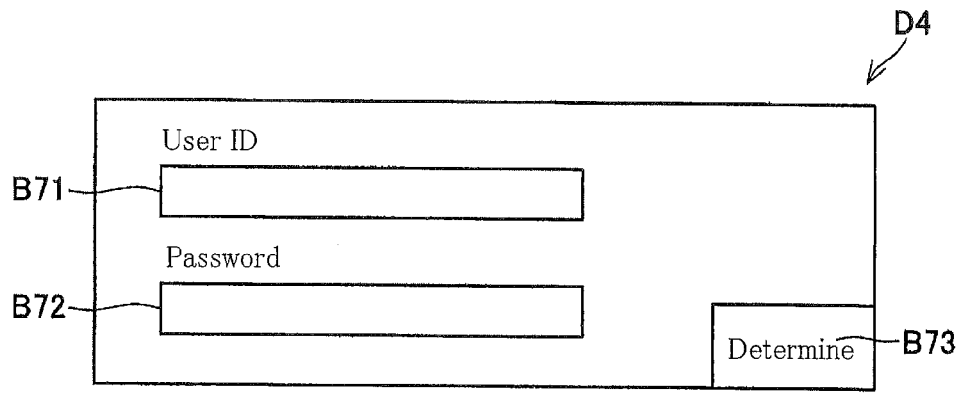
FIG. 10 is a view illustrating one example of a user authentication screen D4.

The CPU 22 at S557 displays a user authentication screen D4 on the display device 14 based on the user-authentication screen information. The user authentication screen D4 is a screen for receiving input of authentication information which is used for authentication in the first service server 100. FIG. 10 illustrates one example of the user authentication screen D4. The user-ID input area B71 is an area for receiving input of a user ID which is registered in the first service server 100 in advance. The password input area B72 is an area for receiving input of a password which is registered in the first service server 100 in advance. The user ID and the password are information used by a user operating the MFP 10 to log in to the first service. The user ID and the password may be input by the user via the operation device 12. The button image B73 is for receiving input of an instruction for determining the input operation.

The CPU 22 at S560 receives input of the user ID and the password from the user. The CPU 22 at S570 transmits the input user ID and password to the first service server 100.

The CPU 103 of the first service server 100 at S571 determines whether user authentication has succeeded or not. Specifically, the CPU 103 determines whether the user ID and the password transmitted from the MFP 10 are stored in the function limiting table TB11 (see FIG. 16) or not. When a negative decision is made (S571: NO), this flow goes to S572. The CPU 103 at S572 transmits authentication failure information to the MFP 10. The CPU 22 of the MFP 10 at S573 controls the display device 14 to display an error screen indicating a failure of the user authentication on the first service server 100, and this flow ends.

When a positive decision is made at S571 (S571: YES), this flow goes to S575. The CPU 103 at S575 sends the MFP 10 function limiting information on a user who operates the MFP 10. The function limiting information indicates functions for which execution is limited by the first service, among the plurality of functions implementable by the MFP 10. For example, in the case where a user A is operating the MFP 10, as indicated by a region R11 of the function limiting table TB11 illustrated in FIG. 16, the CPU 103 at S575 transmits function limiting information indicating that execution of the printing function and the copying function is limited.

The CPU 22 at S580 displays a function list screen D5 on the display device 14. The function list screen D5 displayed on the display device 14 contains at least one function image each representing a function for which execution is not limited by the function limiting information among the various kinds of functions of the MFP 10, and the at least one function image is displayed in a manner in which selection of the image can be received. Also, the function list screen D5 displayed on the display device 14 contains at least one function image each representing a function for which execution is limited by the function limiting information, and the at least one function image is displayed in a manner in which selection of the image cannot be received. The function list screen D5 is for receiving selection of one of the at least one function for which execution is not limited.

Figure 11:
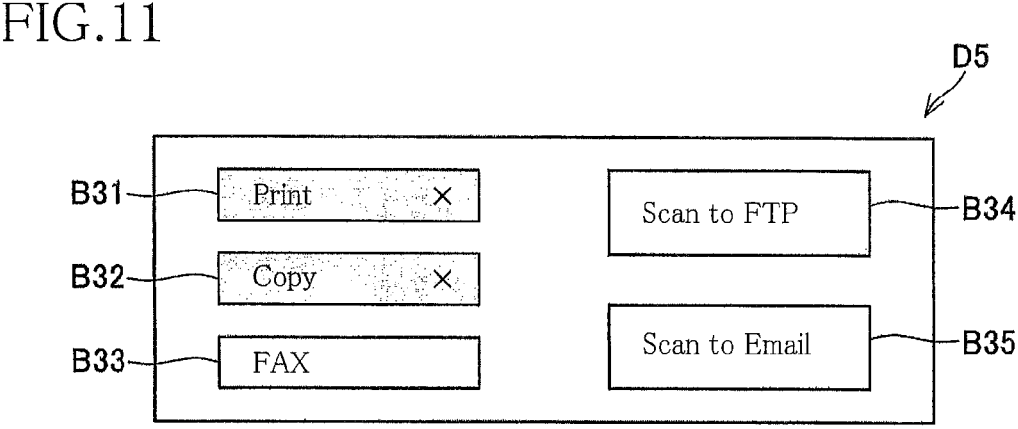
FIG. 11 is a view illustrating one example of a function list screen D5.

FIG. 11 illustrates one example of the function list screen D5. The function list screen D5 is one example of a screen in the case where the user A is operating the MFP 10. Button images B31-B35 are the same as the respective button images B11-B15 illustrated in FIG. 8, and an explanation of which is dispensed with. Each of the button images B31, B32 indicates a function for which execution is limited by the function limiting information. Accordingly, the button images B31, B32 are displayed in a manner in which selection cannot be received or accepted (that is, each image is attached with a cross mark and is grayed out).

The CPU 22 at S590 receives user input of selection of a function to be used. For example, the CPU 22 may receive the input of selection of a function to be used, in response to tapping on one of the button images displayed on the function list screen D5.

The CPU 22 at S595 determines whether the selected function is a function for which execution is limited or not. This determination may be executed by determining whether tapping has been performed on a button image displayed in the manner in which selection cannot be received. When a positive decision is made (S595: YES), this flow returns to S590. When a negative decision is made (S595: NO), this flow goes to S600. The CPU 22 at S600 uses the function selected at S590, to execute various kinds of processings.

The CPU 22 at S610 determines whether a setting has been changed or not on one of the relay server 60 and the first-third service servers 100-120 during the execution of the processing at S600. This determination may be executed by determining whether the service change information is stored in the memory 24 or not. The service change information will be described later at S955. When a negative decision is made (S610: NO), this flow returns to S540. When a positive decision is made (S610: YES), this flow goes to S620. The CPU 22 at S620 reads the service change information from the memory 24, and this flow returns to S530. At S530 and subsequent steps, the processings are executed again based on the read service change information.

Figure 2:
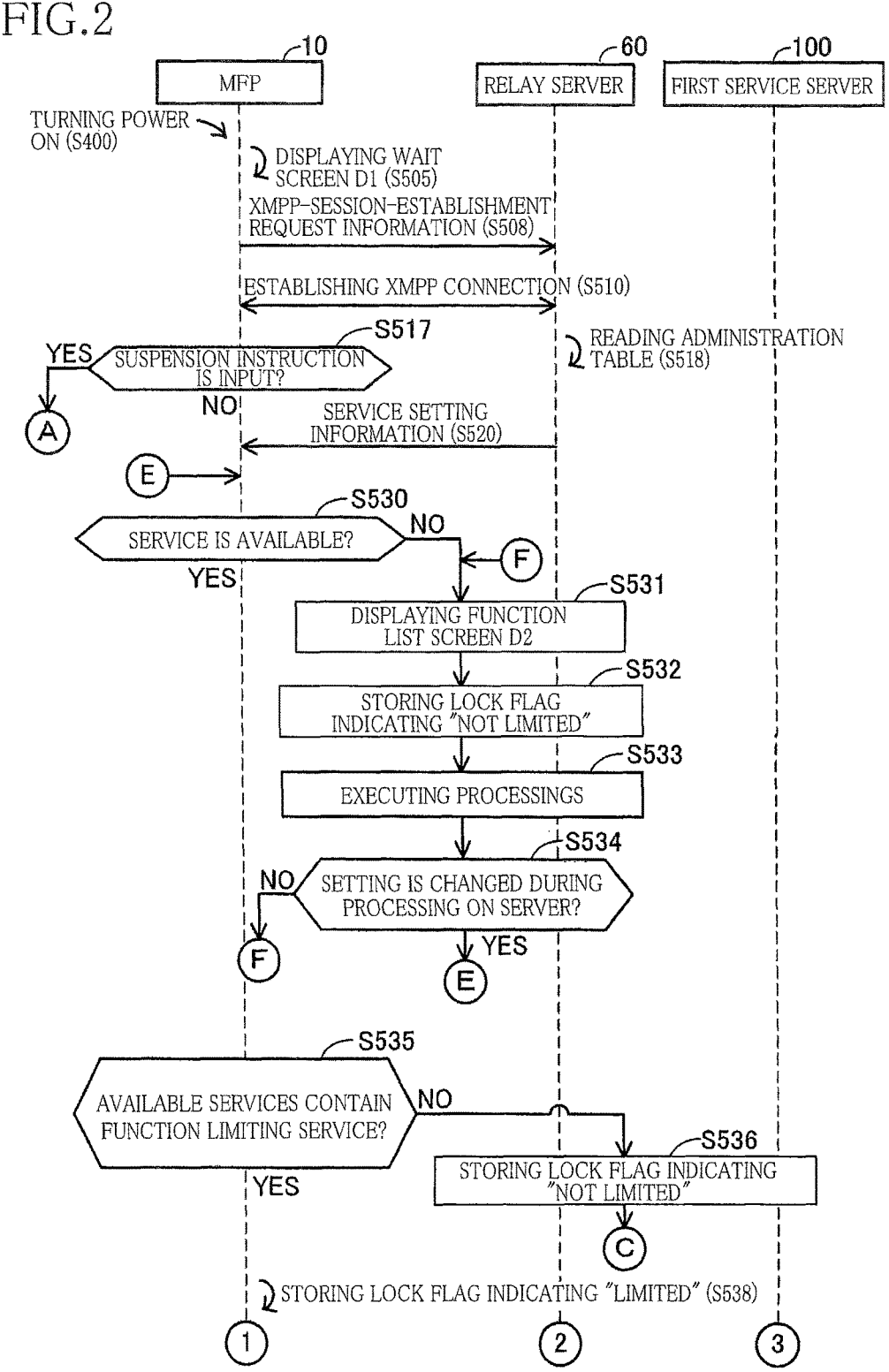
FIG. 2 is a sequence diagram illustrating one example of processings executed in the communication system.
Figure 3:
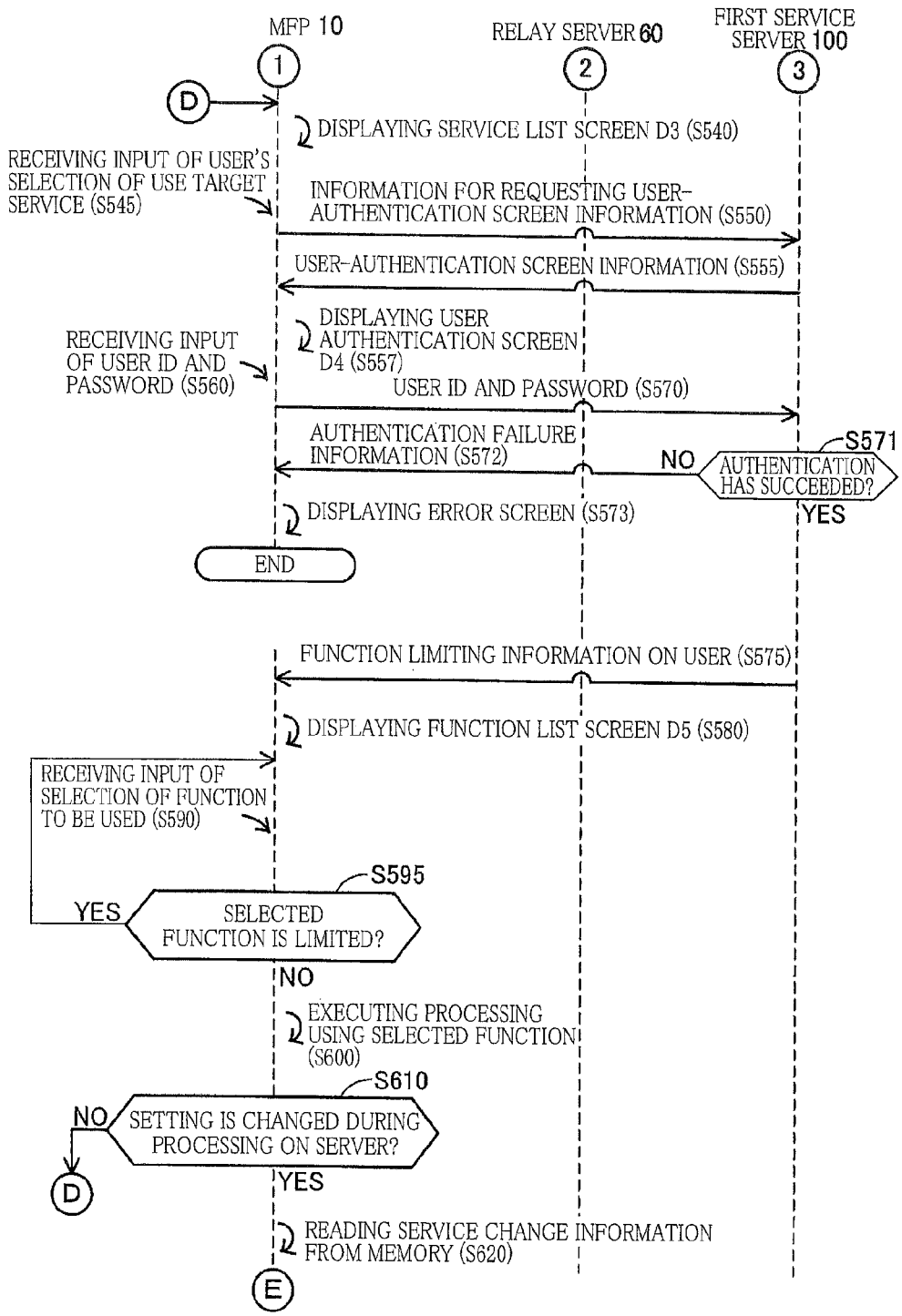
FIG. 3 is a sequence diagram illustrating one example of processings executed in the communication system.

When the CPU 22 at S535 in FIG. 2 determines that the services available to the MFP 10 does not contain the function limiting service (S535: NO), this flow goes to S536. One example of the case where a negative decision is made at S535 is a case where the user is operating the MFP 10a.

This is because, as indicated by a region R21 of the administration table TB1 in FIG. 15, the service available to the MFP 10a is only the third service, i.e., the data providing service.

Figure 4:
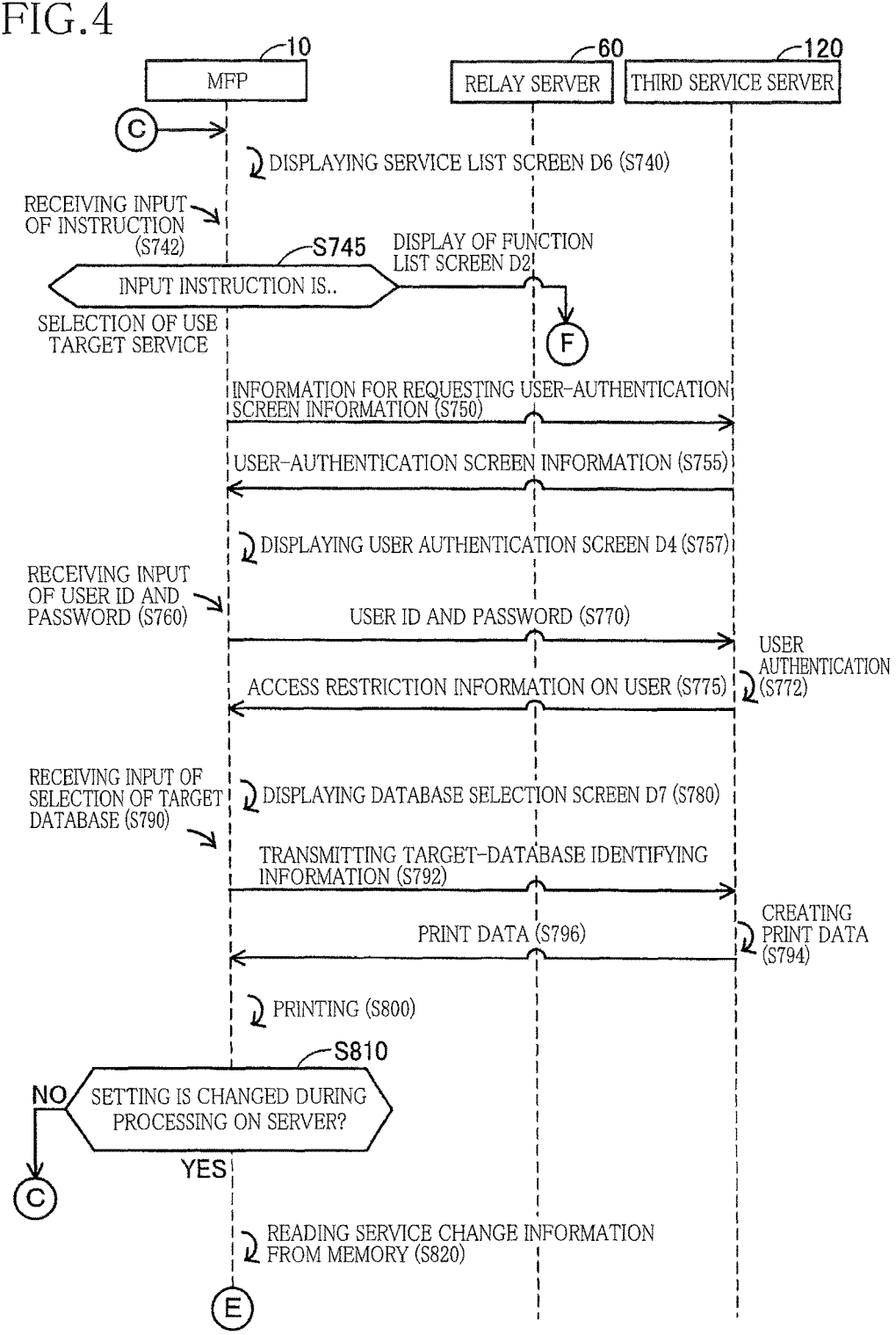
FIG. 4 is a sequence diagram illustrating one example of processings executed in the communication system.
Figure 5:
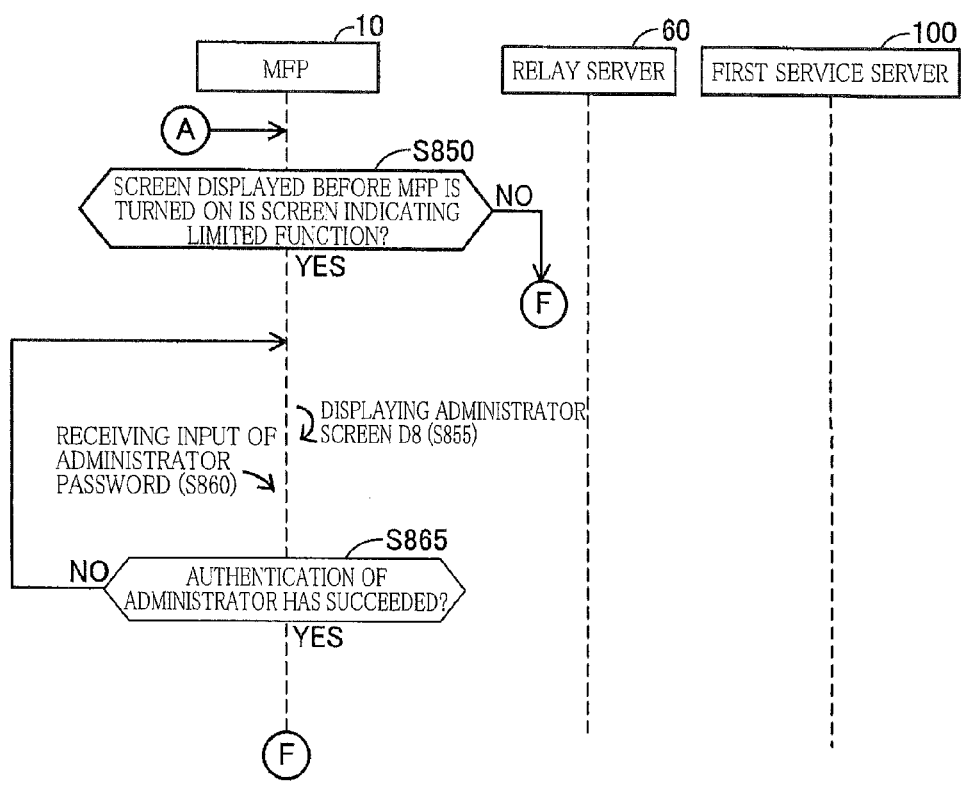
FIG. 5 is a sequence diagram illustrating one example of processings executed in the communication system.

The CPU 22 at S536 stores the lock flag indicating "Not Limited" into the non-transitory storage area of the memory 24, and this flow goes to S740 in FIG. 4. The CPU 22 at S740 displays a service list screen D6 on the display device 14. The service list screen D6 contains an image representative of a usable service and receives selection of a use target service. The service list screen D6 also contains a function-selection button image which will be described below. That is, the service list screen D6 is in an unlocked state such that the various kinds of functions of the MFP 10 can be used.

Figure 12:
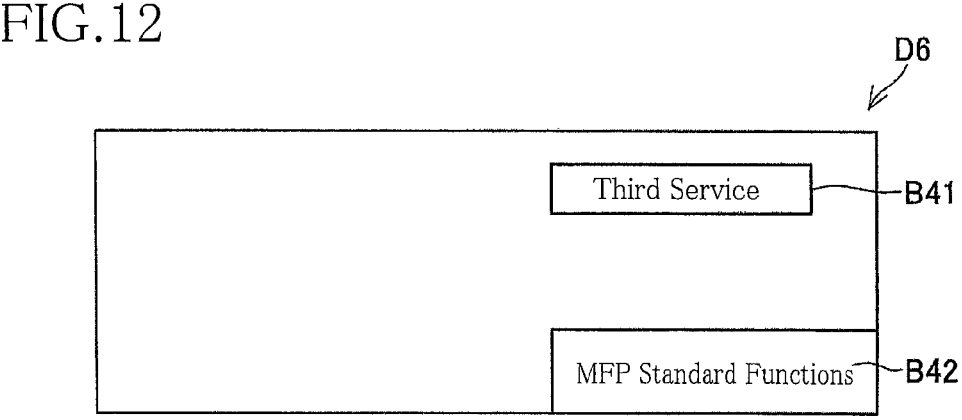
FIG. 12 is a view illustrating one example of a service list screen D6.

FIG. 12 illustrates one example of the service list screen D6. The service list screen D6 contains a button image B41 and the function-selection button image B42. The button image B41 is for selection of the third service provided by the third service server 120, as a service to be used. The function-selection button image B42 is for receiving input of a screen transition instruction for instructing a screen transition to the function list screen D2 (see FIG. 8) for selection of one of the various kinds of functions of the MFP 10.

The CPU 22 at S742 receives input of an instruction provided by the user. The CPU 22 at S745 determines a detail of the input instruction. When the instruction for the screen transition to the function list screen D2 is input (S745: DISPLAY OF FUNCTION LIST SCREEN D2), this flow goes to S531 in FIG. 2.

When an operation for selecting the use target service is input (S745: SELECTION OF USE TARGET SERVICE), this flow goes to S750. In the example in the present embodiment, there will be next explained operations and processings in the case where the third service is selected as the use target service by tapping on the button image B41 displayed on the service list screen D6 (FIG. 12).

The CPU 22 at S750 sends the third service server 120 the information for requesting the user-authentication screen information. The CPU 22 at S755 receives the user-authentication screen information from the third service server 120. The CPU 22 at S757 controls the display device 14, based on the user-authentication screen information, to display a user authentication screen for authentication in the third service server 120. One example of the user authentication screen has been explained using the user authentication screen D4 illustrated in FIG. 10, and an explanation of which is dispensed with.

The CPU 22 at S760 receives input of the user ID and the password from the user. The CPU 22 at S770 transmits the input user ID and password to the third service server 120. The third service server 120 at S772 performs user authentication. The user authentication has been explained in the explanation for the processing at S571, and an explanation of which is dispensed with.

The third service server 120 at S775 sends the MFP 10 access restriction information on the user who operates the MFP 10. The access restriction information indicates a database or databases for which access of the user who operates the MFP 10 is restricted among the first-third databases provided by the third service. For example, in the case where the user A is operating the MFP 10, as indicated by a region R31 of the data providing table TB13 illustrated in FIG. 17, the third service server 120 at S775 transmits the access restriction information indicating that access to the third database is restricted.

The CPU 22 at S780 displays a database selection screen D7 on the display device 14. On the database selection screen D7, a database to which access is not restricted by the access restriction information among the first-third databases provided by the third service is displayed in a manner in which selection can be received. Also, a database to which access is restricted by the access restriction information is displayed in the manner in which selection cannot be received. Also, the database selection screen D7 receives selection of one of at least one database to which access is not restricted.

FIG. 13 illustrates one example of the database selection screen D7. The database selection screen D7 is one example of a screen displayed in the case where the user A is operating the MFP 10. Each of the button images B51, B52 is for receiving input of an instruction for accessing a corresponding one of the first and second databases. A button image B53 indicates a database to which access is restricted by the access restriction information. Accordingly, the button image B53 is displayed in the manner in which selection cannot be received (that is, the image is attached with a cross mark and is grayed out).

The CPU 22 at S790 receives user input of selection of a target database. For example, the CPU 22 may receive the user input of selection of the target database in response to tapping on one of the button images displayed on the database selection screen D7. The CPU 22 at S792 transmits target-database identifying information to the third service server 120.

The third service server 120 at S794 creates print data based on data stored in the target database. In the case where the target database is a database of newspaper, for example, the third service server 120 creates print data for printing each page. The third service server 120 at S796 transmits the created print data to the MFP 10. The CPU 22 at S800 uses the received print data to control the printing device 18 to execute a print processing. The CPU 22 at S800 may use the received print data to execute another function.

Processings at S810 and S820 are respectively the same as the above-described processings at S610 and S620, and an explanation of which is dispensed with.

When the CPU 22 determines at S517 in FIG. 2 that the input of the canceling instruction has been received (S517: YES), this flow goes to S850 in FIG. 5. The CPU 22 at S850 determines whether or not a screen displayed on the display device 14 before the MFP 10 is turned on at S400 in this flow is a screen indicating that use of the various kinds of functions of the MFP 10 is limited. This determination may be executed by determining whether the lock flag stored in the non-transitory storage area of the memory 24 indicates "Limited" or "Not Limited". When a negative decision is made at S850 (S850: NO), this flow goes to S531 in FIG. 2. When a positive decision is made at S850 (S850: YES), this flow goes to S855.

The CPU 22 at S855 displays an administrator screen on the display device 14. The administrator screen is for receiving input of an administrator password for identifying an administrator of the MFP 10. FIG. 14 illustrates one example of an administrator screen D8. The password input area B61 is an area for receiving input of the administrator password which is registered in the MFP 10 in advance. The button image B62 is for receiving input of an instruction for determining the input operation.

The CPU 22 at S860 receives input of the administrator password which is performed by the administrator of the MFP 10. The CPU 22 at S865 determines whether authentication of the administrator has succeeded or not. When a negative decision is made (S865: NO), this flow returns to S855. When a positive decision is made (S865: YES), this flow goes to S531 in FIG. 2.

Operations in Communication System 2 (in Operations of Server Administrator)

Figure 6:
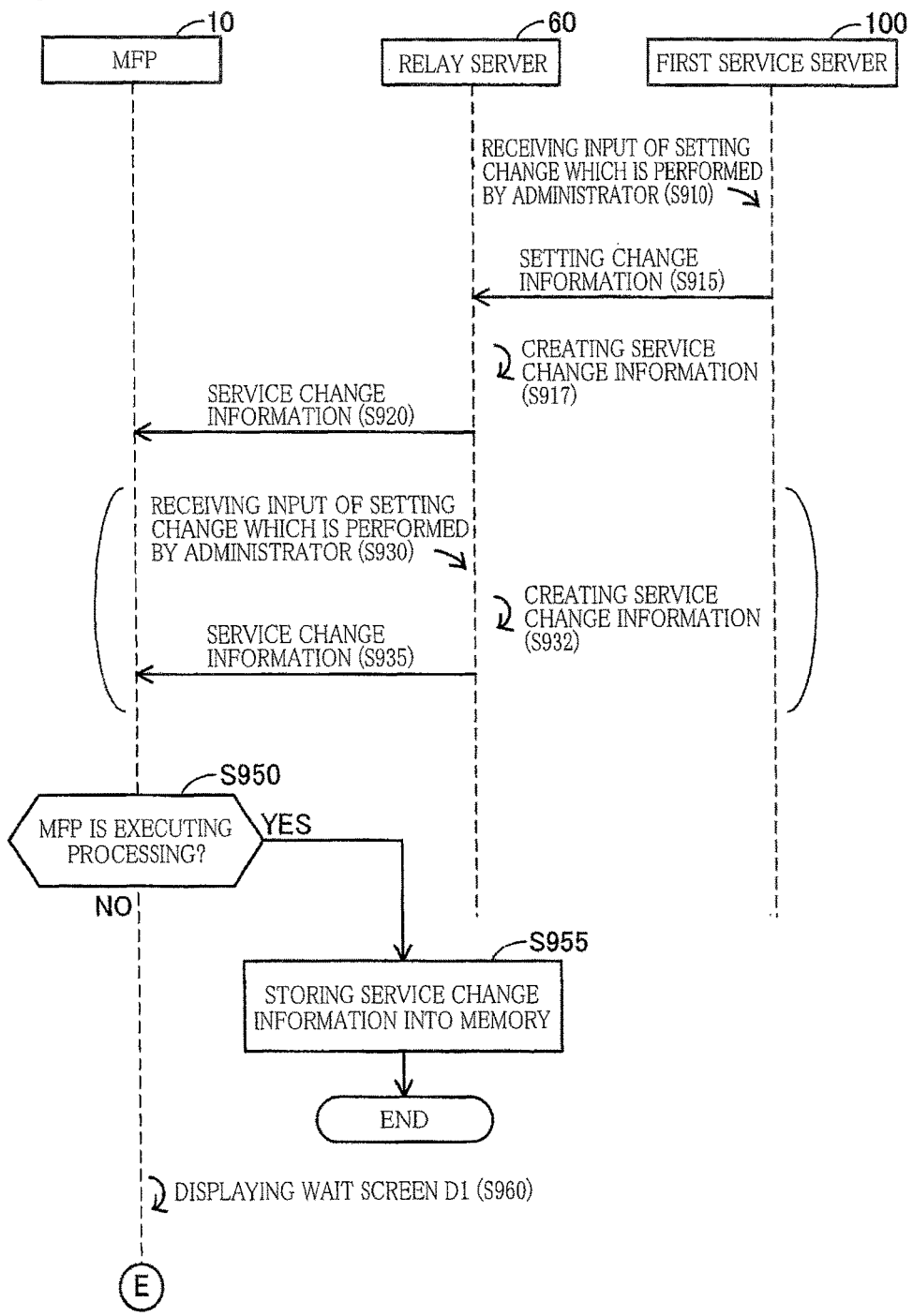
FIG. 6 is a sequence diagram illustrating one example of processings executed in the communication system.

There will be next explained, with reference to FIG. 6, operations and processings in the communication system 2 in the case where a server administrator operates the first-third service servers 100-120 and the relay server 60. There will be explained, by way of example, the case where an administrator of the first service server 100 operates the first service server 100 and the case where an administrator of the relay server 60 operates the relay server 60.

The CPU 103 of the first service server 100 at S910 receives input of setting change which is performed by the administrator of the first service server 100. Examples of the setting change include: change in the type of the first service to a service (e.g., the data providing service) different from the function limiting service; and change in the contents stored in the function limiting table TB11 (see FIG. 16). The CPU 103 at S915 sends the relay server 60 setting change information indicating details of the setting change performed at S910.

The CPU 72 of the relay server 60 at S917 creates the service change information by changing the contents of the service setting information (which are indicated in the explanation for the processing at S520) based on the setting change information. The CPU 72 at S920 transmits the created service change information to the MFP 10 as the HTTP request information. The service change information is transmitted to the MFP 10 using the XMPP connection (see S510) established between the relay server 60 and the MFP 10.

The CPU 72 of the relay server 60 at S930 receives input of the setting change which is performed by the administrator of the relay server 60. One example of the setting change is change in the contents stored in the administration table TB1 (see FIG. 15). The CPU 72 at S932 creates the service change information by changing the contents of the service setting information based on the details of the setting change input at S930. The CPU 72 at S935 transmits the created service change information to the MFP 10 as the HTTP request information. The service change information is transmitted to the MFP 10 using the XMPP connection established between the relay server 60 and the MFP 10.

The processings at S910-S920 and the processings at S930-S935 may be executed individually at different timings. Thus, the processings at S930-S935 are parenthesized in FIG. 6.

The CPU 22 of the MFP 10 at S950 determines whether the MFP 10 is executing a processing such as the print processing or not. When a positive decision is made (S950: YES), this flow goes to S955. The CPU 22 at S955 temporarily stores the service change information received at S920 or S935, into the memory 24, and this flow ends.

When a negative decision is made at S950 (S950: NO), this flow goes to S960. The CPU 22 at S960 displays the wait screen D1 (see FIG. 7) on the display device 14, and this flow returns to S530 in FIG. 2. The processings are executed again at S530 and subsequent steps based on the service change information received at S920 or S935.

Concrete Example of Configuration of Communication System 2

There will be next explained a concrete example of the configuration of the communication system 2. The MFP may be installed in a public place such as a convenience store and an airport and in a closed place such as an office. The MFP may be installed by a supplier for installing the MFP and may be installed by a convenience store or a company. A person or company who installs the MFP may make a profit by use of unspecified individuals. The person or company who installs the MFP determines a service or services usable on the installed MFP among the first-third services and registers the determined service or services into the administration table TB1 of the relay server 60. The relay server 60 may be managed by a vendor of the MFP or the supplier for installing the MFP.

As advance preparations, a user registers a user ID and a password for one or some of the first-third services which the user wants to use, and creates a user account. The first-third services may be managed by the supplier for installing the MFP or a third party. In the case where the user needs to perform printing outside of inside his or her office, the user searches for the MFP placed in any place. In the case where the found MFP offers a service registered by the user, the user inputs account information of the registered service into the MFP to log in to the service. This configuration allows the user to use the MFP outside or inside his or her office.

Effects

The service setting information indicating the usable service is transmitted at S520 from the relay server 60 to the MFP 10. In the case where the user uses the MFP 10a, for example, as indicated by the region R21 of the administration table TB1 (see FIG. 15), the usable service is only the third service, i.e., the data providing service. That is, the usable service does not contain the function limiting service (S535: NO), allowing the service list screen D6 (see FIG. 12) to be displayed on the display device 14 (S740). The service list screen D6 contains the function-selection button image B42 for a transition to the screen for selection of one of the various kinds of functions of the MFP 10a. Accordingly, the MFP 10a is in the unlocked state in which the various kinds of functions of the MFP 10a can be used. In the case where the user uses the MFP 10, as indicated by a region R22 of the administration table TB1 (see FIG. 15), the usable service is the first and third services. That is, the usable service contains the first service as the function limiting service (S535: YES), allowing the service list screen D3 (see FIG. 9) to be displayed on the display device 14 (S540). The service list screen D3 does not contain the function-selection button image for the transition to the screen for selection of one of the various kinds of functions of the MFP 10a. Accordingly, the MFP 10 is in the locked state in which the various kinds of functions of the MFP 10 cannot be used. In view of the above, the state of the MFP can be controlled between the locked state in which use of the various kinds of functions of the MFP is limited and the unlocked state in which the use of the various kinds of functions of the MFP is not limited, depending upon whether the usable service contains the function limiting service or not. This configuration can appropriately limit the use of the various kinds of functions of the MFP.

In the case where the setting change is performed in one of the first-third service servers 100-120 (S910), information indicating the detail of the setting change cannot be directly transmitted from the one of the first-third service servers 100-120 to the MFP 10 for the following reason. In the case where the information is transmitted from one of the first-third service servers 100-120, the HTTP request information is to be transmitted to the MFP 10, but the HTTP request information transmitted from an external device different from the MFP 10 is rejected by the firewall on the router 7. In the present technique, when the XMPP-session-establishment request information is transmitted from the MFP 10 to the relay server 60 (S508), the XMPP connection is established between the MFP 10 and the relay server 60 (S510). In the case where the setting change is performed one of the first-third service servers 100-120 and the relay server 60 (S910), the service change information indicating the setting change transmitted from one of the first-third service servers 100-120 can be transmitted to the MFP 10 via the relay server 60 (S920). This configuration allows the service change information to be transmitted using the XMPP connection between the MFP 10 and the relay server 60. Thus, the service change information as the HTTP request information can be transmitted to the MFP 10 over the firewall. Accordingly, the MFP 10 can be controlled from the first-third service servers 100-120. Thus, in the case where the setting change is performed for one of the first-third service servers 100-120, the MFP 10 can be immediately informed about the change.

In the present technique, when the service change information is received from the relay server 60 (S920, S935), the service list screen D6 (see FIG. 12) and the service list screen D3 (see FIG. 9) can be displayed again based on the received service change information (S740, S540). This configuration makes it possible for the user to be notified via the display device 14 of the MFP 10 about information indicating that the setting change is performed on one of the first-third service servers 100-120 and the relay server 60.

For example, in the case where the relay server 60 stores information about each user into the administration table TB1 (see FIG. 15), user authentication is required for the user to access the relay server 60. This case may require duplicate user authentication on the relay server 60 and on a server providing the use target service. In the present technique, the administration table TB1 of the relay server 60 stores services usable by the MFP and does not store information about each user. This configuration allows the communication system 2 to be configured such that user authentication is required on only the service server providing the use target service. Accordingly, the number of required user authentications can be reduced, resulting in increase in convenience for the user. This makes it possible to reduce a load of managing the user information in the relay server 60 and a load of the authentication processing.

In the present technique, the function list screen D5 (see FIG. 11) can be displayed on the display device 14 (S580). On the function list screen D5, an image representative of a function for which execution is not limited by the function limiting information can be displayed in the manner in which selection can be received. Also, an image representative of a function for which execution is limited by the function limiting information can be displayed in the manner in which selection cannot be received. With this configuration, the user can visually recognize the presence or absence of the limitation of execution of each of the functions.

In the case where the service setting information is received from the relay server 60 (S520), the reception of the service setting information may be failed due to, e.g., a trouble in a network and may require a long time due to, e.g., heavy traffic in communication. In the present technique, in such cases, the reception of the service setting information can be canceled (S517). Also, when the administrator password is input by the administrator of the MFP (S865: YES), it is made possible to receive selection of the use target service (S545). With this configuration, the MFP can be used separately from the communication system 2. Accordingly, even in the case where reception of the service setting information is difficult, various kinds of processings can be executed using the MFP.

While the embodiment has been described above, it is to be understood that the disclosure is not limited to the details of the illustrated embodiment, but may be embodied with various changes and modifications, which may occur to those skilled in the art, without departing from the spirit and scope of the disclosure. There will be explained modifications.

First Modification

A first modification will be explained with reference to FIG. 18. When the MFP 10 is turned on at S400, this flow goes to S410. The CPU 22 at S410 determines whether the lock flag is stored or not. When a negative decision is made (S410: NO), this flow goes to S505 in FIG. 2. When a positive decision is made (S410: YES), this flow goes to S420.

The CPU 22 at S420 determines whether or not the screen displayed on the display device 14 before the MFP 10 is turned on at S400 in this flow is a screen indicating that use of the various kinds of functions of the MFP 10 is limited. This determination may be executed by determining whether the lock flag stored in the non-transitory storage area of the memory 24 indicates "Limited" or "Not Limited". When a positive decision is made (S420: YES), this flow goes to S430. The CPU 22 at S430 displays the service list screen D3 (see FIG. 9) on the display device 14, and this flow goes to S508 in FIG. 2.

When a negative decision is made at S420 (S420: NO), this flow goes to S440. The CPU 22 at S440 displays the function list screen D2 (see FIG. 8) on the display device 14, and this flow goes to S508 in FIG. 2.

When the XMPP-session-establishment request information is transmitted from the MFP 10 to the relay server 60 at S508, the XMPP connection is at S510 established between the MFP 10 and the relay server 60, and the service setting information is at S520 transmitted from the relay server 60. When the service setting information is received at S520, one of the function list screen D2 (S531, FIG. 8), the service list screen D6 (S740, FIG. 12), and the service list screen D3 (S540, FIG. 9) is displayed on the display device 14 based on the received service setting information. In this operation, a new screen is displayed instead of the screen displayed at S430 or S440.

As a result, the screen displayed on the display device 14 before the MFP 10 is turned on can be displayed on the display device 14 (S430, S440) instead of the wait screen (see FIG. 7) at a point in time immediately after the MFP 10 is turned on at S400. With this configuration, the user does not need to wait until the wait screen is switched, thereby increasing convenience for the user.

Also, when the latest service setting information is acquired (S520), the image temporarily displayed at S430 or at S440 can be switched to an image based on the latest service setting information (S531, S740, S540). With this configuration, the image temporarily displayed can be updated to the latest image.

Second Modification

Figure 20:
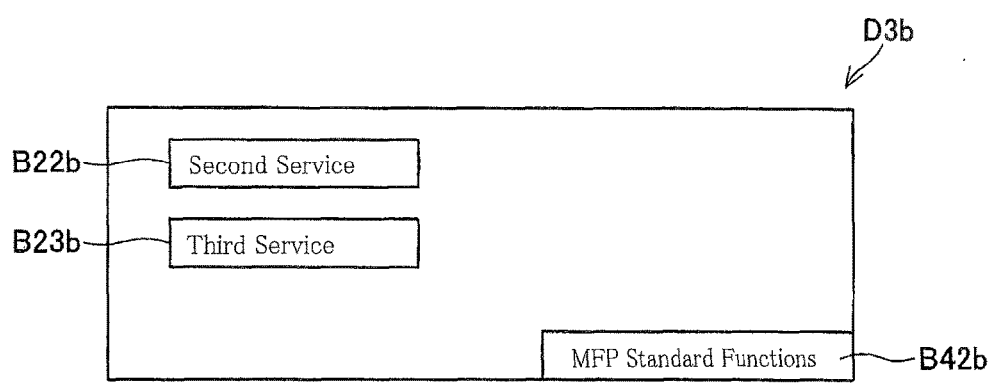
FIG. 20 is a view illustrating a service list screen D3b as a modification of the service list screen D3.

In this second modification, the function limiting service is in the above-described second form. In this modification, the service setting information transmitted at S520 contains the contents stored in the administration table TB2 (see FIG. 19). Thereafter, the determination in the processing at S535 is not executed, and the flow goes to S540. The CPU 22 at S540 displays a service list screen D3*b* on the display device 14. FIG. 20 illustrates one example of the service list screen D3*b*. The service list screen D3*b* is one example of a screen in the case where the MFP 10 is set such that the second and third services can be used. Each of button images B22*b*, B23*b* is for receiving input of an instruction for selecting a corresponding one of the second service and the third service as the use target service. A function-selection button image B42*b* is for receiving input of a screen transition instruction for instructing a screen transition to a function list screen D2*b* (see FIG. 21). The function list screen D2*b* is for receiving selection of one of functions which can be used on the MFP 10 in a period before the service is used (that is, in a period before the user has logged in to the service).

Figure 21:
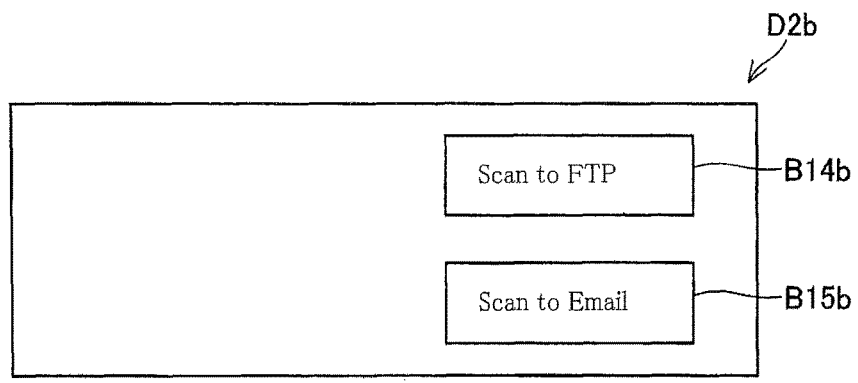
FIG. 21 is a view illustrating a function list screen D2b as a modification of the function list screen D2.

When tapping on the function-selection button image B42*b* is detected, the CPU 22 determines that an instruction for a screen transition to the function list screen D2*b* has been input. The CPU 22 displays the function list screen D2*b* on the display device 14. FIG. 21 illustrates one example of the function list screen D2*b*. The function list screen D2*b* contains images respectively representative of functions (indicated by a region R41 in FIG. 19) which are stored in the administration table TB2 in a state in which the functions can be used for both of the second and third services selected as the use target service. That is, the function list screen D2*b* contains button images B14*b*, B15*b* each for receiving input of an instruction for executing a corresponding one of the scan_to_FTP function and the scan_to_Email function. As a result, the user can use these functions of the MFP 10 before logging in to the service. It is noted that the function list screen D2*b* contains images respectively representative of the functions stored in the administration table TB2 which can be used for a plurality of services, and the function list screen D2*b* does not contain images respectively representative of the functions (e.g., the printing function, the copying function, and the facsimile function) stored in the administration table TB2 which cannot be used for a plurality of services.

Other Modifications

Any of the service list screen D6 (FIG. 12) and the database selection screen D7 (FIG. 13) may be displayed first. For example, the database selection screen D7 may be displayed at S740. The database selection screen D7 may contain a button image for receiving input of a screen transition instruction for instructing a screen transition to the service list screen D6. When the button image is tapped, the service list screen D6 may be displayed. The order of display of the service list screen D6 and the database selection screen D7 may be stored in the relay server 60 in advance. The communication system 2 may be configured such that information indicating the order of display is transmitted at S520 to the MFP 10, and the screens are displayed in the order indicated by the information. Also, switching of the screen may be omitted by displaying one screen containing all the images displayed on the service list screen D6 and the database selection screen D7.

Various kinds of display manners may be employed for displaying the image representative of the function for which execution is limited, on the function list screen (S580, FIG. 11), in the manner in which selection cannot be received. For example, images respectively representative of functions for which execution is limited may not be displayed on the display device 14.

A method of transmitting the HTTP request information from the relay server 60 to the MFP 10 is not limited to that using the XMPP connection. Any method may be used as long as the HTTP request information can pass through the firewall.

The administration table TB1 (see FIG. 15) may not store usable services for each MFP and may store usable services for each group containing a plurality of MFPs. With this configuration, settings of all the MFPs in the group can be changed at a time only by change in the contents stored in the administration table TB1.

While each of the first-third service servers 100-120 provides a corresponding one of the first-third services in the above-described embodiment, this invention is not limited to this configuration. For example, one server may provide a plurality of services.

Data provided from the third service server 120 at S794 and S796 is not limited to the print data and may be various kinds of data such as image data and movie data.

MFPs communicably connected to the relay server 60 are not limited to the MFPs 10-10*b*, and four or more MFPs may be communicably connected to the relay server 60. Service servers connected to the Internet 6 are not limited to the first-third service servers 100-120, and four or more service servers may be connected to the Internet 6. The MFPs 10-10*b* are contained in the communication system 2 by way of example, but the present invention is not limited to this configuration. The communication system 2 may contain sewing machines configured to embroider and quilt a particular image based on instruction data. Also, the communication system 2 may contain sewing machines configured to do sewing and decorative stitching to manufacture products based on image data. Also, the communication system 2 may contain a 3D printer configured to create a 3D image based on instruction data by additive manufacturing, curving, and other techniques.

The processings (S950-S960, S610, S620, S810, and S820) for reflecting the setting change made on, e.g., the relay server 60, on the MFP may be omitted. In this case, the flow may go from S920 or S935 to S530 in FIG. 2. The authentication processing (S850-S865) performed by the administrator of the MFP may be omitted. The processings using the lock flag (e.g., S532, S536, S538, and S850) may be omitted. In view of the above, generally speaking, the MFP 10 only needs to execute at least an identification-information transmitting process, a first receiving process, a processing for receiving selection of a service, and a processing for receiving selection of a function. By way of specific example, the MFP 10 only needs to execute at least the processings at S508, S520, S740, and S540.

Each of the first-third service servers 100-120 is one example of a server. The relay server 60 is one example of a relay device. The MFPs 10-10*b* is one example of an image processing apparatus. The network interface 16 is one example of a communication interface.

Each of the printing device 18 and the scanning device 19 is one example of a processor. The MFPID is one example of identification information. The processing executed by the CPU at S508 is one example of an identification-information transmitting process. The processing executed by the CPU at S520 is one example of a first receiving process. The processings executed by the CPU at S540, S740, and S580 in the second modification are one example of a first process. The processing executed by the CPU at S742 is one example of a second process (i.e., the processing for receiving selection of the function). The processing executed by the CPU at S545 is another example of the second process (i.e., the processing for receiving selection of the service). XMPP over BOSH is one example of a first protocol. The processing executed by the CPU at S508 is one example of an establishment-request-information transmitting process. The processings executed by the CPU at S920 and 935 are one example of a second receiving process. The lock flag is one example of first information. The memory 24 is one example of a storage. The processings executed by the CPU at S532, 536, and 538 are one example of a storage control processing. The processings executed by the CPU at S430 and 440 are one example of a display control process. The processing executed by the CPU at S505 is one example of an instruction receiving process. The administrator password is one example of administrator identification information. The processing executed by the CPU at S855 is one example of an administrator-information receiving process. The processing executed by the CPU at S531 is one example of a selection receiving process. The processing executed by the CPU at S796 is one example of a data receiving process.

What is claimed is:

1. An image processing apparatus, comprising:
a processor configured to execute a plurality of functions;
a communication interface configured to communicate with a plurality of servers and a relay device, the plurality of servers comprising a first server providing a first execution limitation service for the image processing apparatus and a second server providing a second execution limitation service for the image processing apparatus, the relay device storing information indicating whether the first execution limitation service by the first server can be used by the image processing apparatus and whether the second execution limitation service by the second server can be used by the image processing apparatus;
a display; and
a controller configured to cause the image processing apparatus as a first image processing apparatus to:
transmit first apparatus-identification information to the relay device via the communication interface,
in response to receiving setting information transmitted from the relay device, control the display to display a first execution limitation service image when the received setting information indicates that use of the first execution limitation service by the first image processing apparatus is permitted and to display a second execution limitation service image when the received setting information indicates that use of the second execution limitation service by the first image processing apparatus is permitted, the first execution limitation service image being an image indicating the first image apparatus is permitted to use the first execution limitation service, the second execution limitation service image being an image indicating the first processing apparatus is permitted to use the second execution limitation service, the first execution limitation service limiting execution of at least one function of the plurality of functions;
receive a selection of one of the first execution limitation service and the second execution limitation service based on the displayed first execution limitation service image and the displayed second execution limitation service image;
in response to receiving the selection of the first execution limitation service image, request the first server to transmit user-authentication screen information to the first image processing apparatus;
in response to receiving the user-authentication screen information, control the display to display a user-authentication screen;
in response to receiving user-identification information, transmit the user-identification information to the first server;

in response to receiving function limiting information which is transmitted from the first server when the first server has received the user-identification-information from the first image processing apparatus, control the display to display at least one function image in a first manner, and the at least one function image displayed in the first manner respectively identifies the at least one function for which selection is not limited based on the setting information, and to display at least one function image in a second manner different from the first manner, and the at least one function image displayed in the second manner respectively identifies the at least one function for which selection is limited based on the function limiting information, the first apparatus-identification information identifying the first image processing apparatus and being unique to the first image processing apparatus, the plurality of servers and the relay device each being connected to the first image processing apparatus and a second image processing apparatus different from the first image processing apparatus, the second image processing apparatus being configured to transmit second apparatus-identification information to the relay device, the second apparatus-identification information identifying the second image processing apparatus and being unique to the second image processing apparatus, wherein the first image processing apparatus receives, from the relay device via the communication interface, (i) the setting information for the first execution limitation service indicating whether individual settings for limitation on executions of processes executable by the first image processing apparatus are collectively enabled or disabled based on the function limiting information that is stored in the first server and that indicates whether execution of each of the processes executable by the first image processing apparatus is limited for each of a plurality of users permitted to log in and use the first image processing apparatus and (ii) the setting information for the second execution limitation service indicating whether individual settings for limitation on executions of processes executable by the first image processing apparatus are collectively enabled or disabled based on information that is stored in the second server and that indicates whether execution of each of the processes executable by the first image processing apparatus is limited for each of the plurality of users permitted to log in and use the first image processing apparatus, and wherein the first image processing apparatus receives the function limiting information from the first server via the communication interface, the function limiting information indicating whether the user identified by the user-identification information is permitted to use the at least one of the plurality of functions of the first execution limitation service.

2. The image processing apparatus according to claim 1, wherein the display displays at least one function image in the first manner, and the at least one function image displayed in the first manner respectively identifies at least one function for which selection is not limited based on the setting information and wherein the display displays at least one function image in the second manner different from the first manner, and the at least one function image displayed in the second manner respectively identifies the at least one function for which selection is limited based on the function limiting information.

3. The image processing apparatus according to claim 2, wherein the at least one function image displayed on the display in the first manner is selectable, and the at least one function image displayed on the display in the second manner is not selectable.

4. The image processing apparatus according to claim 1, wherein the display displays at least one function image respectively identifying at least one function for which selection is not limited based on the setting information, and wherein the display does not display at least one function image respectively identifying the at least one function for which selection is limited based on the function limiting information.

5. The image processing apparatus according to claim 1, wherein when the second execution limitation service does not limit the execution of the at least one of the plurality of functions, the display displays the second service image, and the display further displays a plurality of images respectively indicating the plurality of functions.

6. The image processing apparatus according to claim 5, wherein the controller causes the first image processing apparatus to:

receive selection of one of the plurality of images respectively indicating the plurality of functions.

7. The image processing apparatus according to claim 1, wherein the controller is configured to cause the first image processing apparatus to transmit establishment request information to the relay device via the communication interface, the establishment request information being for requesting establishment of a session between the relay device and the first image processing apparatus, the session allowing push transmission of request information from the relay device to the first image processing apparatus according to a first protocol of a session-establishment type; and use the session established between the relay device and the first image processing apparatus, to receive the setting information as the request information transmitted from the relay device to the first image processing apparatus.

8. The image processing apparatus according to claim 1, wherein the controller is configured to cause the first image processing apparatus to store first information into a storage of the first image processing apparatus, the first information indicating whether the setting information received most recently indicates that use of the first execution limitation service by the first image processing apparatus is permitted; and after the first image processing apparatus is turned on, when the first image processing apparatus determines, based on the first information stored in the storage, that the setting information indicates that use of the first execution limitation service by first image processing apparatus is not permitted, display a plurality of images respectively indicating a plurality of functions for which selection is not limited on the display in a manner in which selection is receivable, and when the first image processing apparatus determines, based on the first information, that the setting information indicates that use of the first execution limitation service by the first image processing apparatus is permitted, display the second service image is displayed on the display.

9. The image processing apparatus according to claim 8, wherein the first image processing apparatus receives the setting information from the relay device after the first image processing apparatus controls the display in the display control process to display the plurality of images respectively indicating the plurality of functions or the second service image, and wherein when the received setting information indicates that use of the first execution limitation service by the first image processing apparatus is not permitted, the plurality of images respectively indicating the plurality of functions are selectably displayed on the display instead of the plurality of images or the second service image, and when the setting information indicates that use of the first execution limitation service by the first image processing apparatus is permitted, the second service image identified by the received setting information is displayed instead of the plurality of images or the second service image.

10. The image processing apparatus according to claim 1, wherein the controller is configured to cause the first image processing apparatus to receive input of a canceling instruction for canceling a process in which the first image processing apparatus receives the setting information from the relay device;

when the input of the canceling instruction is received, receive input of administrator identification information identifying an administrator of the first image processing apparatus; and when the administrator identification information is received in the administrator-information receiving process control the display to display a plurality of images respectively indicating a plurality of functions for which selection is not limited; and receive selection of any of the plurality of functions.

11. The image processing apparatus according to claim 1, wherein when the first image processing apparatus is turned on, the first image processing apparatus transmits the first apparatus-identification information identifying the first image processing apparatus, to the relay device.

12. The image processing apparatus according to claim 1, wherein the setting information is set for each of a plurality of image processing apparatuses and stored in the relay device in advance.

13. The image processing apparatus according to claim 1, wherein the processor is configured to execute at least one of a printing function, a facsimile function, a scanning function, and a copying function.

14. The image processing apparatus according to claim 6, wherein when the second execution limitation service is a data providing service for providing data, the controller causes the first image processing apparatus to:

control the display to display a service image identifying the data providing execution limitation service; and receive selection of the data providing execution limitation service, and wherein the controller is configured to cause the first image processing apparatus to, when the selection of the data providing execution limitation service is received, receive the data from the data providing execution limitation service.

15. The image processing apparatus according to claim 1, wherein the first execution limitation service comprises a function limiting service that limits at least the printing function.

16. The image processing apparatus according to claim 1, wherein each of the first apparatus-identification information and the first apparatus-identification information is a serial number.

17. A communication system, comprising a plurality of servers; a relay device; and an image processing apparatus, the image processing apparatus comprising: a processor configured to execute a plurality of functions; a communication interface configured to communicate with the plurality of servers and a relay device; the plurality of servers comprising a first server providing a first execution limitation service for the image processing apparatus and a second server providing a second execution limitation service for the image processing apparatus, the relay device storing information indicating whether the first execution limitation service by the first server can be used by the image processing apparatus and whether the second execution limitation service by the second server can be used by the image processing apparatus; and a display, the processor being configured to cause the image processing apparatus as a first image processing apparatus to:

transmit first apparatus-identification information to the relay device via the communication interface; in response to receiving setting information transmitted from the relay device, control the display to display a first service image when the received setting information indicates that use of the first execution limitation service by the first image processing apparatus is permitted and to display a second service image when the received setting information indicates that use of the second execution limitation service by the first image processing apparatus is permitted, the first service image being an image indicating the first image apparatus is permitted to use the first execution limitation service, the second service image being an image indicating the first processing apparatus is permitted to use the second execution limitation service, the first execution limitation service limiting execution of at least one function of the plurality of functions;

receive a selection of one of the first execution limitation service and the second execution limitation service based on the displayed first service image and the displayed second service image;

in response to receiving the selection of the first service image, request the first server to transmit user-authentication screen information to the first image processing apparatus;

in response to receiving the user-authentication screen information, control the display to display a user-authentication screen;

in response to receiving user-identification information, transmit the user-identification information to the first server;

in response to receiving function limiting information which is transmitted from the first server when the first server has received the user-identification-information from the first image processing apparatus, control the display to display at least one function image in a first manner, and the at least one function image displayed in the first manner respectively identifies the at least one function for which selection is not limited based on the setting information, and to display at least one function image in a second manner different from the first manner, and the at least one function image displayed in the second manner respectively identifies the at least one function for which selection is limited based on the function limiting information, based on the first apparatus-identification information identifying the first image processing apparatus and being unique to the first image processing apparatus, the plurality of servers and the relay device each being connected to the first image processing apparatus and a second image processing apparatus different from the first image processing apparatus, the second image processing apparatus being configured to transmit second apparatus-identification information to the relay device, the second apparatus-identification information identifying the second image processing apparatus and being unique to the second image processing apparatus, the relay device being configured to transmit, to the first image processing apparatus via the communication interface, (i) the setting information for the first execution limitation service indicating (i) whether individual settings for limitation on executions of processes executable by the first image processing apparatus are collectively enabled or disabled based on the function limiting information that is stored in the first server and that indicates whether execution of each of the processes executable by the first image processing apparatus is limited for each of a plurality of users permitted to log in and use the first image processing apparatus and (ii) the setting information for the second execution limitation service indicating whether individual settings for limitation on executions of processes executable by the first image processing apparatus are collectively enabled or disabled based on information that is stored in the second server and that indicates whether execution of each of the processes executable by the first image processing apparatus is limited for each of the plurality of users permitted to log in and use the first image processing apparatus, wherein the first image processing apparatus receives the function limiting information from the first server via the communication interface, the function limiting information indicating whether the user identified by the user-identification information is permitted to use the at least one of the plurality of functions of the first execution limitation service.

* * * * *